United States Patent Office.

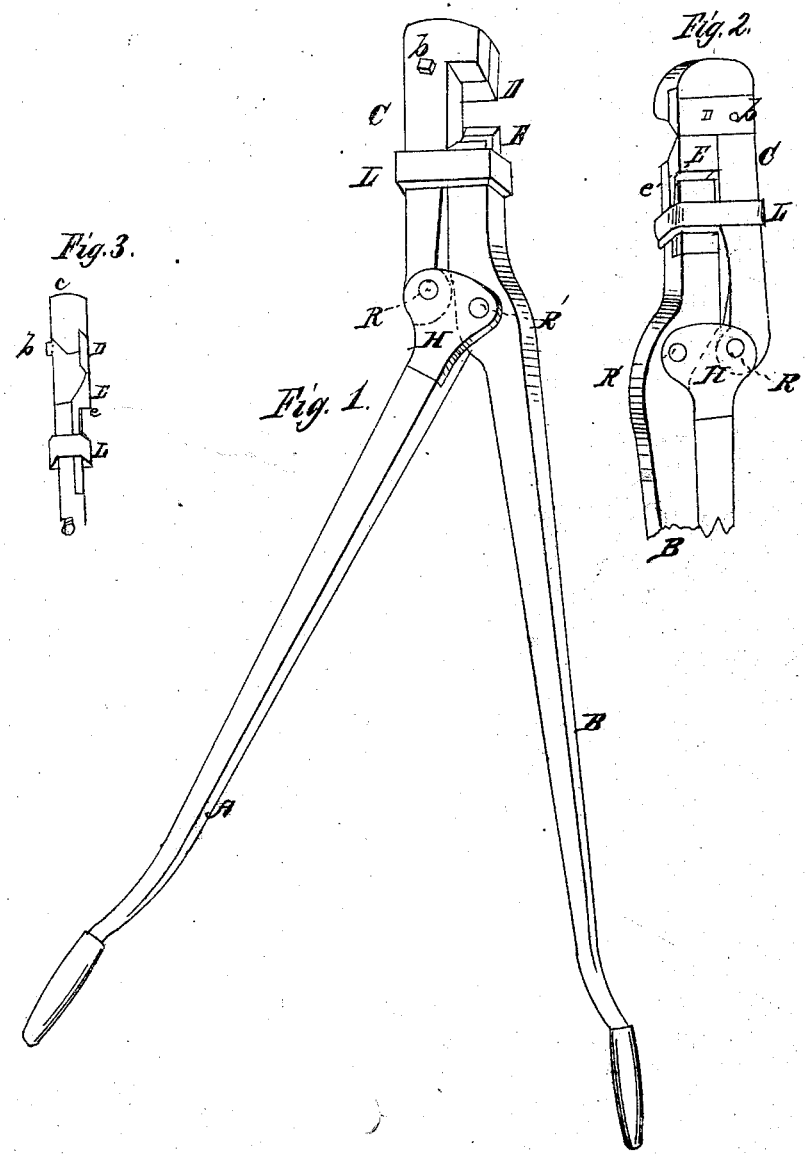

JOHN S. HENRY AND ABRAHAM H. REIST, OF MANHEIM, PENNSYLVANIA.

Letters Patent No. 74,087, dated February 4, 1868.

IMPROVEMENT IN BOLT AND RIVET-CUTTER.

*The Schedule referred to in these Letters Patent and making part of the same.*

TO ALL WHOM IT MAY CONCERN:

Be it known that we, JOHN S. HENRY and ABRAHAM H. REIST, of Manheim, in the county of Lancaster, and State of Pennsylvania, have invented a new and useful Improvement on a Tool for Cutting off Bolts, Rivets, &c.; and we do hereby declare that the following is a full, clear, and exact description of the construction and operation of the same, reference being had to the accompanying drawings, making a part of this specification, in which—

Figure 1 represents the tool drawn apart to open the jaws.

Figure 2, the same in part, showing the under side flush, with the inserted steel jaws D E closed.

Figure 3 is a view of the same on the edge.

The nature of our invention is to apply our cutter from the side of the bolt or rivet, and to dispense with the loop closing both sides of the jaws, and in the mode of the attachment and action of the jaws.

The drawings so clearly show the construction, and its application and operation are readily understood, so as to enable any one skilled in the art to make and use our invention.

The two handles or levers A B, of any desired size and strength, move on pivots R and R'. The arm or lever-handle A is terminated by an enlarged and slotted head, H. This head is connected by a stout pivot, R', to the handle B, which latter is cut out for the reception of a stout steel chisel-bit or cutter, E. This cutter has a shoulder, e, and the blade E slides under a strong loop, L, which loop confines the action of the blades, so as to bring their cutting-edges squarely together. The jaw or blade D is set into and across the round head or end of the piece C, and secured by a dove-tail insertion on screw-headed bolt b, countersunk on the lower side, as is the loop L on the extended arm of B, in order that both blades D E and appliances lie flush or flatly around the rivet to be cut. The piece C, with cutter D, is also connected, at its lower end, by a stout pivot or pin, R, to the slotted head H.

These pivots R R' are the fulcra upon which the tool moves and the blades have their action, and by drawing the lever-handles apart the jaws open, so that the tool can be inserted from the side to embrace the bolt or rivet to be severed. By bringing the lever-handles together the jaws move together, and will make a clean cut. Both blades act in concert, there being a twofold action.

A tool on this plan gives the most satisfactory results, and it is believed to be a decided improvement over that of Mr. Guthrie's, which, like Mr. Johnston's, operates the one cutter between parallel bars, within a loop of the prolonged sides. The cogs in the lever-handle, and on the rack-like arm of the movable cutter, as well as the eccentric action, are sooner rounded by wear than the fixed pivots we use in the manner shown, and our tool can be inserted below a nut that is battered, when too large to allow the loop used in the cases referred to for being slipped over it, so as to get under it with the blades. We are not aware that a tool arranged in the manner shown was ever before used.

What we claim as our invention, is—

The combination and arrangement of the jaws D E, unobstructed on one side, when said jaw D is connected with piece C, with its fixed loop L, and pivot-connection to H, and the jaw or cutter E, with its shoulder e, is or the end of the prolonged handle or lever B, combined and operating in the manner and for the purpose specified.

J. S. HENRY,
A. H. REIST.

Witnesses:
WM. B. WILEY,
JACOB STAUFFER.